US008645065B2

(12) United States Patent
Doi

(10) Patent No.: US 8,645,065 B2
(45) Date of Patent: Feb. 4, 2014

(54) NAVIGATION DEVICE AND TRAFFIC LINE DISPLAY METHOD

(75) Inventor: Shinobu Doi, Fukushima (JP)

(73) Assignee: Alpine Technologies Inc., Tokyo (JP)

( * ) Notice: Subject to any disclaimer, the term of this patent is extended or adjusted under 35 U.S.C. 154(b) by 1031 days.

(21) Appl. No.: 12/703,379

(22) Filed: Feb. 10, 2010

(65) Prior Publication Data

US 2010/0235081 A1 Sep. 16, 2010

(30) Foreign Application Priority Data

Mar. 10, 2009 (JP) ................................ 2009-055969

(51) Int. Cl.
*G08G 1/123* (2006.01)

(52) U.S. Cl.
USPC .. 701/532; 701/117; 340/995.13; 340/995.27

(58) Field of Classification Search
USPC ................. 701/400, 408–409, 431, 437, 439, 701/117–119, 532; 340/995.27, 995.1, 340/995.13–995.15
See application file for complete search history.

(56) References Cited

U.S. PATENT DOCUMENTS

| | | | | |
|---|---|---|---|---|
| 5,931,888 | A * | 8/1999 | Hiyokawa | 701/428 |
| 6,317,687 | B1 * | 11/2001 | Morimoto et al. | 701/441 |
| 6,859,723 | B2 * | 2/2005 | Yokota | 701/532 |
| 7,734,410 | B2 * | 6/2010 | Tooyama et al. | 701/457 |
| 2003/0018427 | A1 * | 1/2003 | Yokota et al. | 701/208 |
| 2003/0120423 | A1 * | 6/2003 | Cochlovius et al. | 701/212 |
| 2004/0107043 | A1 * | 6/2004 | de Silva | 701/200 |
| 2004/0204833 | A1 * | 10/2004 | Yokota | 701/208 |
| 2006/0220923 | A1 * | 10/2006 | Tanizaki et al. | 340/995.1 |
| 2006/0247855 | A1 * | 11/2006 | de Silva et al. | 701/212 |
| 2007/0096945 | A1 * | 5/2007 | Rasmussen et al. | 340/995.1 |
| 2007/0203638 | A1 * | 8/2007 | Tooyama et al. | 701/200 |
| 2007/0208498 | A1 * | 9/2007 | Barker et al. | 701/117 |
| 2008/0208462 | A1 * | 8/2008 | Tanaka | 701/209 |
| 2008/0291205 | A1 * | 11/2008 | Rasmussen et al. | 345/441 |
| 2011/0018818 | A1 * | 1/2011 | Iwano | 345/173 |
| 2011/0035141 | A1 * | 2/2011 | Barker et al. | 701/119 |

FOREIGN PATENT DOCUMENTS

| | | |
|---|---|---|
| JP | 09-236439 | 9/1997 |
| JP | 09-259386 | * 10/1997 |
| JP | 2007-232427 | 9/2007 |
| JP | 2007-333654 | * 12/2007 |

OTHER PUBLICATIONS

Japanese Office Action and English translation—dispatch date Jun. 4, 2013, for Japanese Patent Application No. 2009-055969, 7 pages.

* cited by examiner

*Primary Examiner* — Thomas Black
*Assistant Examiner* — Ce Li
(74) *Attorney, Agent, or Firm* — Brinks Gilson & Lione

(57) ABSTRACT

A navigation device and a traffic line display method which make a user reliably recognize the relationships between traffic lines and roads when the traffic lines are displayed so as to correspond to the roads which are positioned near one another in a concentrated manner or connected to one another are provided. When the roads currently displayed include roads which belong to a certain road type and which are positioned near one another within a predetermined distance or connected to one another and when at least one of the roads has heavy traffic, the vicinity/connection roads positioned near one another within a predetermined distance or connected to one another and the corresponding traffic lines are clearly distinguished from one another by displaying the roads and the corresponding traffic lines so as to be visually separate from one another. Accordingly, the relationships between the traffic lines and roads are reliably recognized.

17 Claims, 6 Drawing Sheets

START
GENERATE MAP IMAGE DATA ~S100
OBTAIN ROAD TRAFFIC INFORMATION ~S120
DISPLAY MAP IMAGE DATA AND TRAFFIC LINE ~S140
S160 ROADS WHICH ARE NEAR EACH OTHER OR WHICH ARE CONNECTED TO EACH OTHER EXIST? YES / NO
S180 AT LEAST ONE ROAD HAS HEAVY TRAFFIC? YES / NO
DISPLAY ICON ~S200
S220 ICON IS SELECTED WITHIN PREDETERMINED PERIOD OF TIME? YES / NO
DISPLAY SIMPLE ROAD GRAPHIC SCREEN ~S240
S260 ONE OF ROADS IS SELECTED? YES / NO
EMPHATICALLY DISPLAY SELECTED ROAD AND CORRESPONDING TRAFFIC LINE ~S280
S300 PREDETERMINED PERIOD OF TIME ELAPSED? YES / NO
S320 END? YES / NO
END

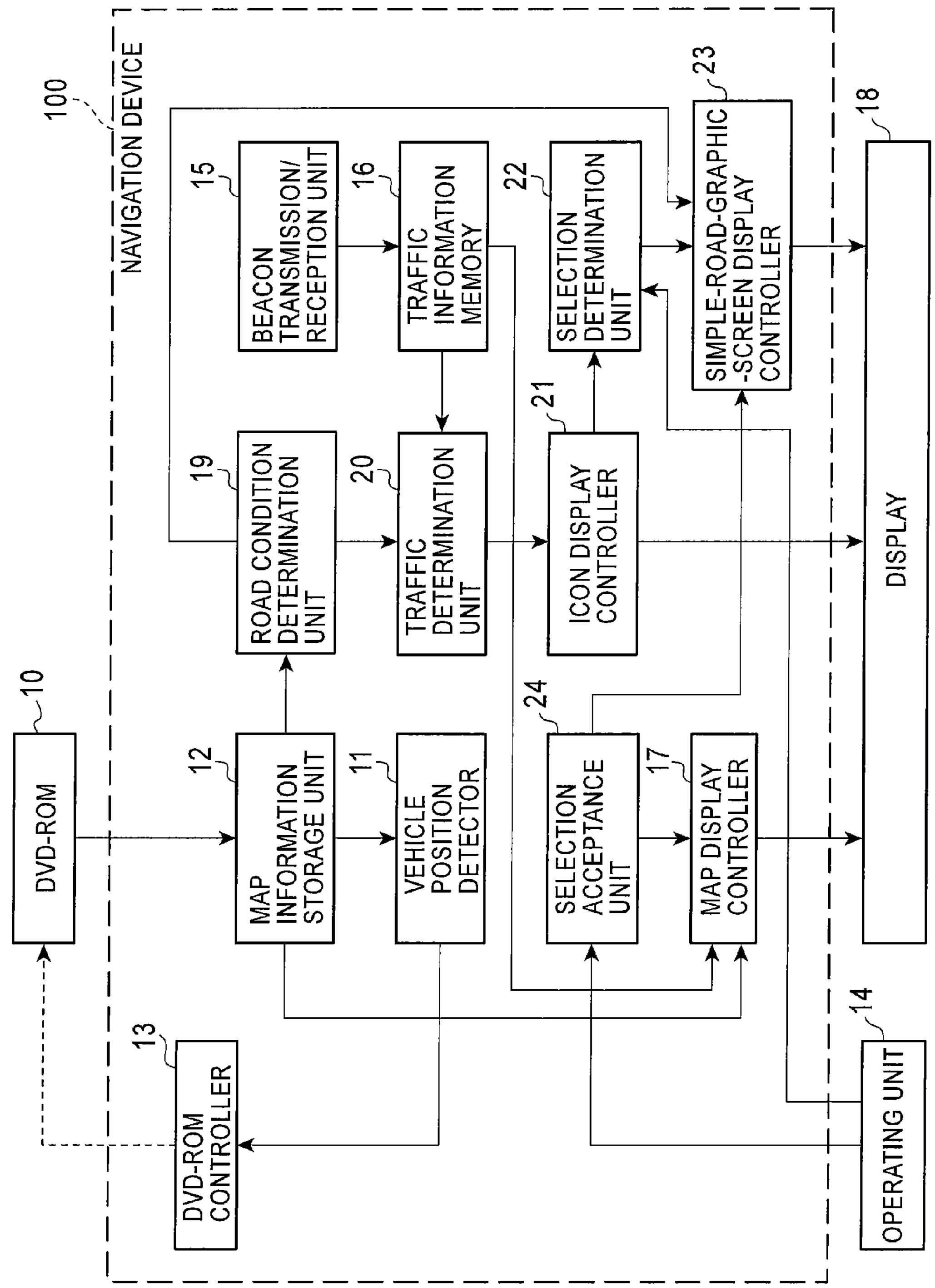
FIG. 1
100
NAVIGATION DEVICE
10
DVD-ROM
12
MAP INFORMATION STORAGE UNIT
11
VEHICLE POSITION DETECTOR
13
DVD-ROM CONTROLLER
19
ROAD CONDITION DETERMINATION UNIT
20
TRAFFIC DETERMINATION UNIT
15
BEACON TRANSMISSION/ RECEPTION UNIT
16
TRAFFIC INFORMATION MEMORY
21
ICON DISPLAY CONTROLLER
22
SELECTION DETERMINATION UNIT
24
SELECTION ACCEPTANCE UNIT
17
MAP DISPLAY CONTROLLER
23
SIMPLE-ROAD-GRAPHIC -SCREEN DISPLAY CONTROLLER
18
DISPLAY
14
OPERATING UNIT FIG. 2A
N
16mi
1/4mi
200
210
FIG. 2B
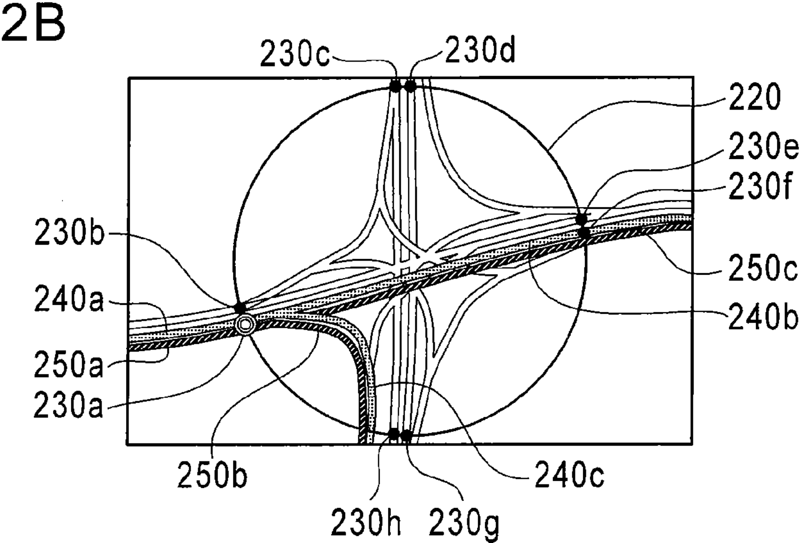
FIG. 2C
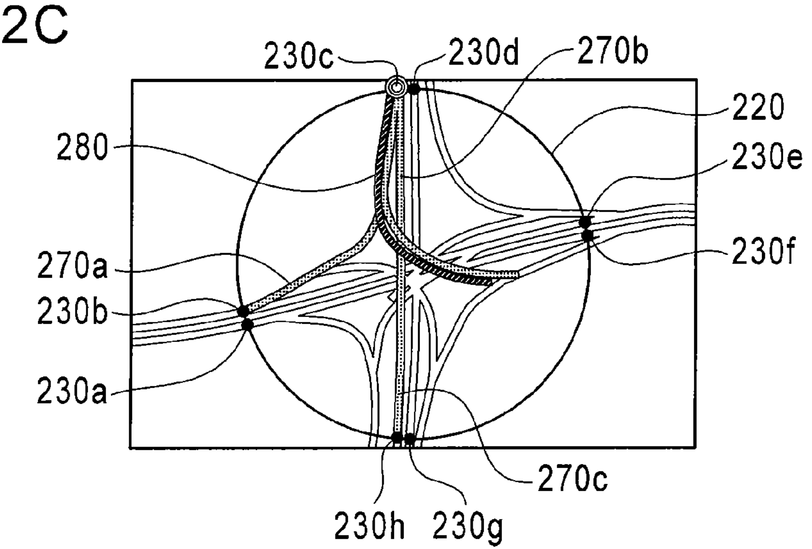

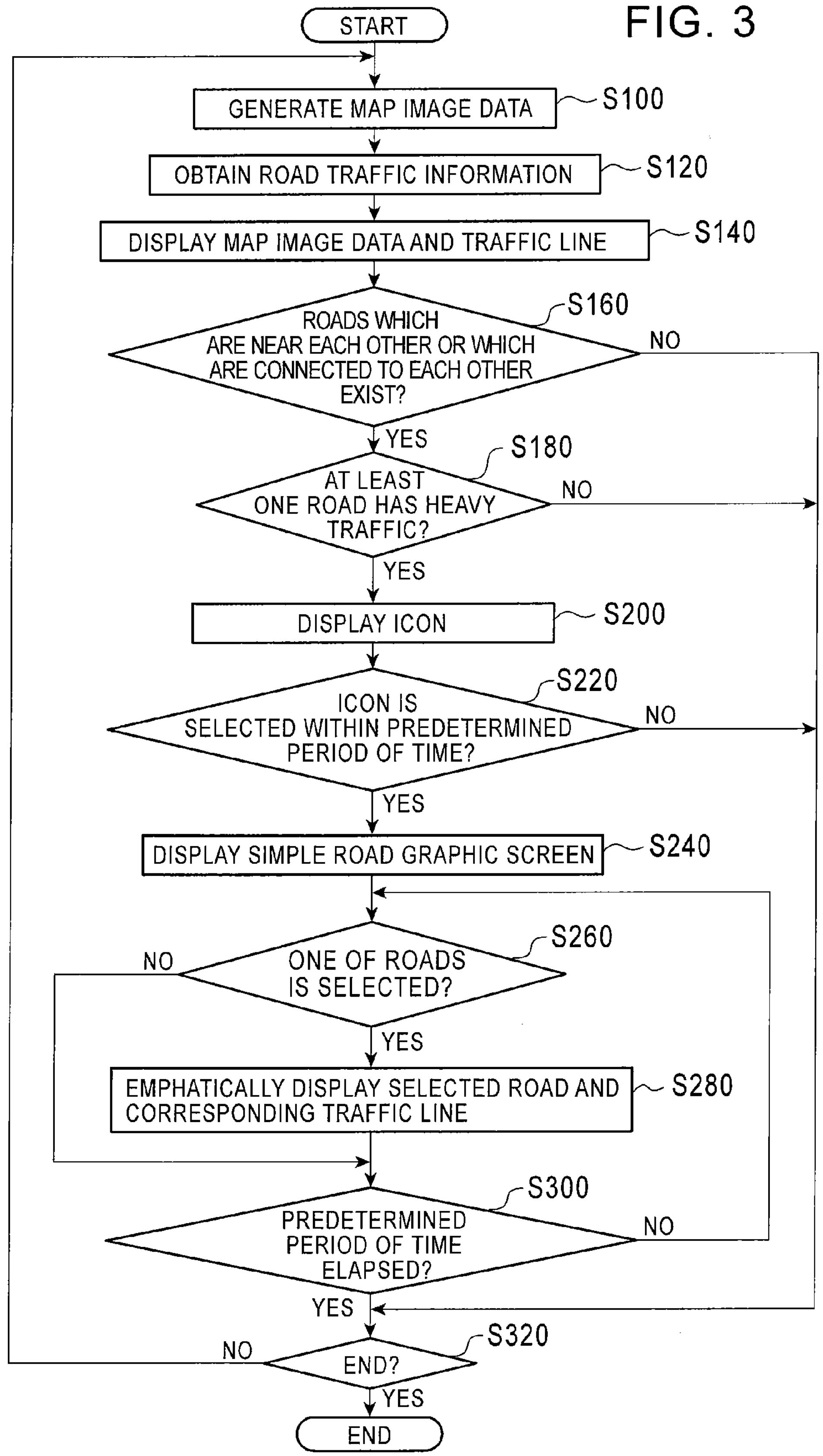
FIG. 3
START
GENERATE MAP IMAGE DATA
S100
OBTAIN ROAD TRAFFIC INFORMATION
S120
DISPLAY MAP IMAGE DATA AND TRAFFIC LINE
S140
ROADS WHICH ARE NEAR EACH OTHER OR WHICH ARE CONNECTED TO EACH OTHER EXIST?
S160
NO
YES
AT LEAST ONE ROAD HAS HEAVY TRAFFIC?
S180
NO
YES
DISPLAY ICON
S200
ICON IS SELECTED WITHIN PREDETERMINED PERIOD OF TIME?
S220
NO
YES
DISPLAY SIMPLE ROAD GRAPHIC SCREEN
S240
ONE OF ROADS IS SELECTED?
S260
NO
YES
EMPHATICALLY DISPLAY SELECTED ROAD AND CORRESPONDING TRAFFIC LINE
S280
PREDETERMINED PERIOD OF TIME ELAPSED?
S300
NO
YES
END?
S320
NO
YES
END 100'
NAVIGATION DEVICE
10
DVD-ROM
12
MAP INFORMATION STORAGE UNIT
11
VEHICLE POSITION DETECTOR
13
DVD-ROM CONTROLLER
19
ROAD CONDITION DETERMINATION UNIT
20
TRAFFIC DETERMINATION UNIT
15
BEACON TRANSMISSION/ RECEPTION UNIT
16
TRAFFIC INFORMATION MEMORY
21'
ICON DISPLAY CONTROLLER
22
SELECTION DETERMINATION UNIT
17'
MAP DISPLAY CONTROLLER
18
DISPLAY
14
OPERATING UNIT

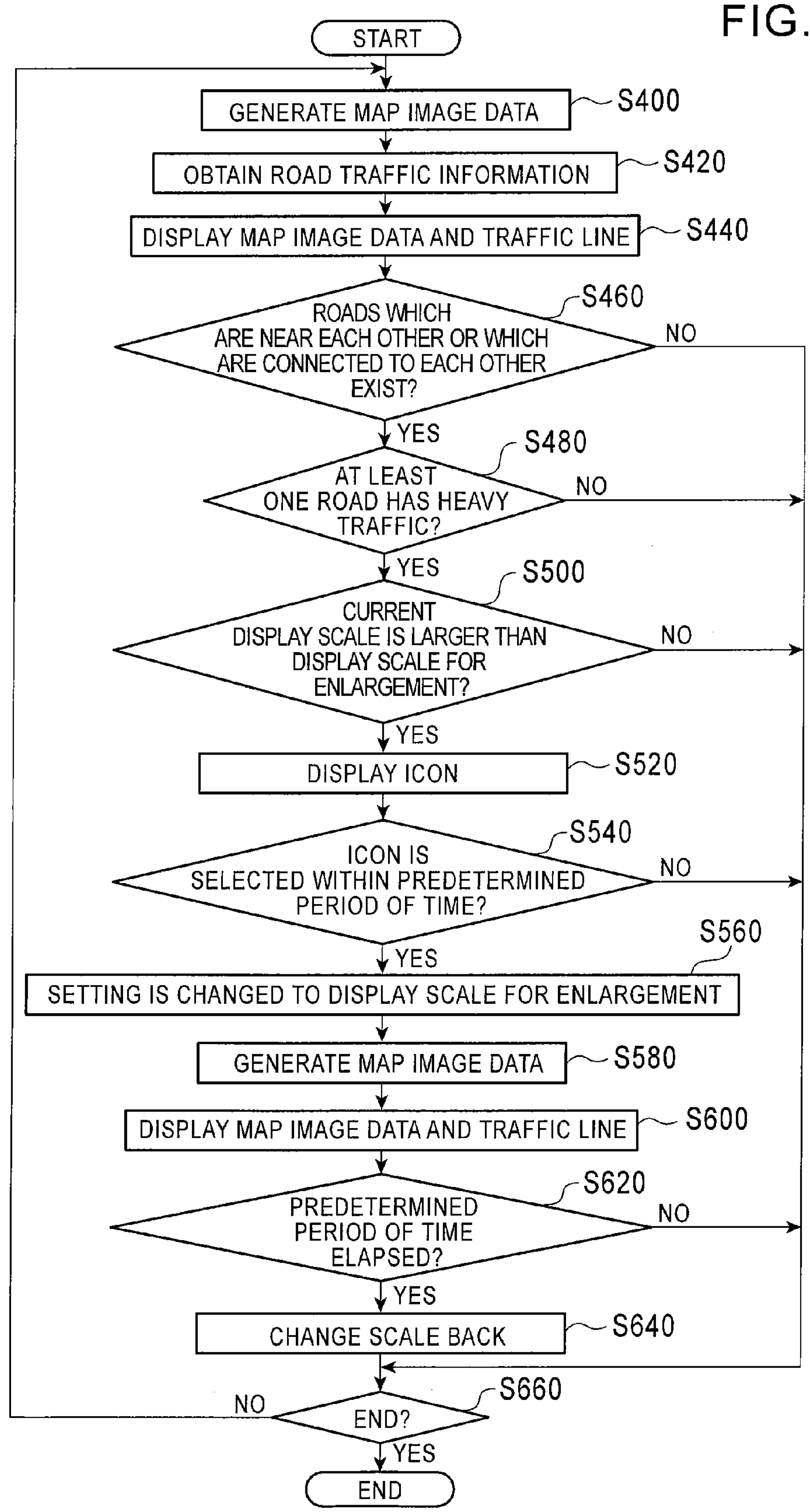
FIG. 6
START
GENERATE MAP IMAGE DATA
S400
OBTAIN ROAD TRAFFIC INFORMATION
S420
DISPLAY MAP IMAGE DATA AND TRAFFIC LINE
S440
ROADS WHICH ARE NEAR EACH OTHER OR WHICH ARE CONNECTED TO EACH OTHER EXIST?
S460
NO
YES
AT LEAST ONE ROAD HAS HEAVY TRAFFIC?
S480
NO
YES
CURRENT DISPLAY SCALE IS LARGER THAN DISPLAY SCALE FOR ENLARGEMENT?
S500
NO
YES
DISPLAY ICON
S520
ICON IS SELECTED WITHIN PREDETERMINED PERIOD OF TIME?
S540
NO
YES
SETTING IS CHANGED TO DISPLAY SCALE FOR ENLARGEMENT
S560
GENERATE MAP IMAGE DATA
S580
DISPLAY MAP IMAGE DATA AND TRAFFIC LINE
S600
PREDETERMINED PERIOD OF TIME ELAPSED?
S620
NO
YES
CHANGE SCALE BACK
S640
END?
S660
NO
YES
END

NAVIGATION DEVICE AND TRAFFIC LINE DISPLAY METHOD

RELATED APPLICATIONS

The present application claims priority to Japanese Patent Application Serial Number 2009-055969, filed Mar. 10, 2009, the entirety of which is hereby incorporated by reference.

BACKGROUND OF THE INVENTION

1. Field of the Invention

The present invention relates to navigation devices and traffic line display methods, and is suitably employed in a navigation device having a function of displaying traffic lines representing traffic congestion levels along roads in a map image.

2. Description of the Related Art

In general, a navigation device detects a current position of a vehicle using a self-contained navigation sensor and a GPS (Global Positioning System) receiver, and displays data of a map of a region around the current position read from a recording medium in a screen. A vehicle position mark representing the position of the vehicle is displayed in the screen so as to overlap on a certain position of the screen. Accordingly, a current position of the vehicle can be recognized on the view.

Most navigation devices in recent years are capable of receiving road traffic information transmitted from Vehicle Information and Communication System Center (VICS center: VICS is a registered trademark) and displaying traffic conditions which change from moment to moment in a navigation screen. The road traffic information can be obtained from light beacons mainly installed in general roads, radio wave beacons mainly installed in expressways, and FM multiple broadcasting utilizing FM broadcasting radio waves.

Such a navigation device utilizes road traffic information and displays traffic congestion conditions (traffic congestion levels of various sections) of roads in a screen so as to notify a driver of the traffic congestion conditions. The road traffic information includes three types of information including first level information (text display), a second level information (simple graphic display), a third level information (map display).

The first-level road traffic information corresponds to character information in which a driver is notified of traffic information and a period of time required for arriving at a certain point by text. The second-level road traffic information corresponds to simple graphic information (image data using a bitmap, for example) in which a driver is notified of traffic information and a period of time required for arriving at a certain point by a simple graphic. In the simple graphic information, congestion sections (red) and crowded sections (orange) are displayed in a default road image provided by the VICS center in advance.

The third-level road traffic information corresponds to map information in which traffic information is indicated by colored arrow marks on a map. In this map information, in accordance with traffic information (information on a congestion section, information on a crowded section, or information on a normal section) of links (vectors representing finely divided roads and lanes) transmitted from the VICS center, blinking red traffic lines representing congestion sections and blinking orange traffic lines representing crowded sections are displayed along roads corresponds to the links. Furthermore, blue traffic lines are displayed along roads in which vehicles are normally traveling in the map.

Note that a road traffic information display device capable of easily selecting desired road traffic information only by touching a region of a touch key assigned to a portion of road traffic information displayed in the screen by a finger even when a plurality of types of road traffic information such as traffic information, restriction information, and parking information are mixed has been proposed (refer to Japanese Unexamined Patent Application Publication No. 9-236439, for example). Furthermore, a device capable of displaying, even when a region in map information is displayed as large area display in a scale larger than a predetermined scale, traffic information can be displayed along a road which is omitted and is not displayed has been proposed (refer to Japanese Unexamined Patent Application Publication 2007-232427, for example).

In expressways, ramps (connection paths which connect a plurality of expressways with one another) may be crowded, especially in expressways that connect cities with large traffic volume. However, there arises a problem in that, in a known technique, if traffic lines are displayed along individual expressways around ramps where a plurality of expressways are concentrated, a traffic line may be hidden by another expressway other than an expressway corresponding to the traffic line, or the relationships between the traffic lines and the corresponding expressways are not clear since the plurality of traffic lines are displayed in a mixed manner. For example, in a portion where a plurality of expressways intersect with one another, since at least a portion of a traffic line of an expressway located in a lower layer is overlapped by a traffic line of another expressway located in a higher layer, for example, the two traffic lines are seen as a lump of mixed color having no meanings. Therefore, the relationships between the traffic lines and the expressways are not clear.

Furthermore, in addition to the expressways, in national roads and prefectural roads, the relationships between traffic lines and the roads may be complicated in portions where a plurality of roads are concentrated.

SUMMARY OF THE INVENTION

The present invention has been made to address these problems, and an object of the present invention is that a user reliably recognizes the relationships between traffic lines and roads when the traffic lines are displayed so as to correspond to the roads which are located close to one another or which are connected to one another in a concentrated manner.

To address the problems described above, according to the present invention, when roads currently displayed include roads which belong to a certain road type and which are positioned near one another within a predetermined distance or connected to one another and when at least one of the roads has heavy traffic, the roads are displayed so as to be visually separate from one another and traffic lines corresponding to the roads are displayed so as to be visually separate from one another.

Accordingly, since the user can clearly recognize the roads which are positioned near one another within a predetermined distance or connected to one another and the traffic lines corresponding to the roads, the user can reliably recognize the relationships between the roads which extend in a concentrated manner and the corresponding traffic lines.

BRIEF DESCRIPTION OF THE DRAWINGS

FIG. 1 is a block diagram illustrating an example of a configuration of a navigation device;

FIGS. 2A to 2C are diagrams illustrating examples of screen displays of a navigation device;

FIG. 3 is a flowchart illustrating an example of an operation of a navigation device;

FIG. 6 is a flowchart illustrating another example of an operation of a navigation device.

DESCRIPTION OF THE PREFERRED EMBODIMENTS

Figure 4:
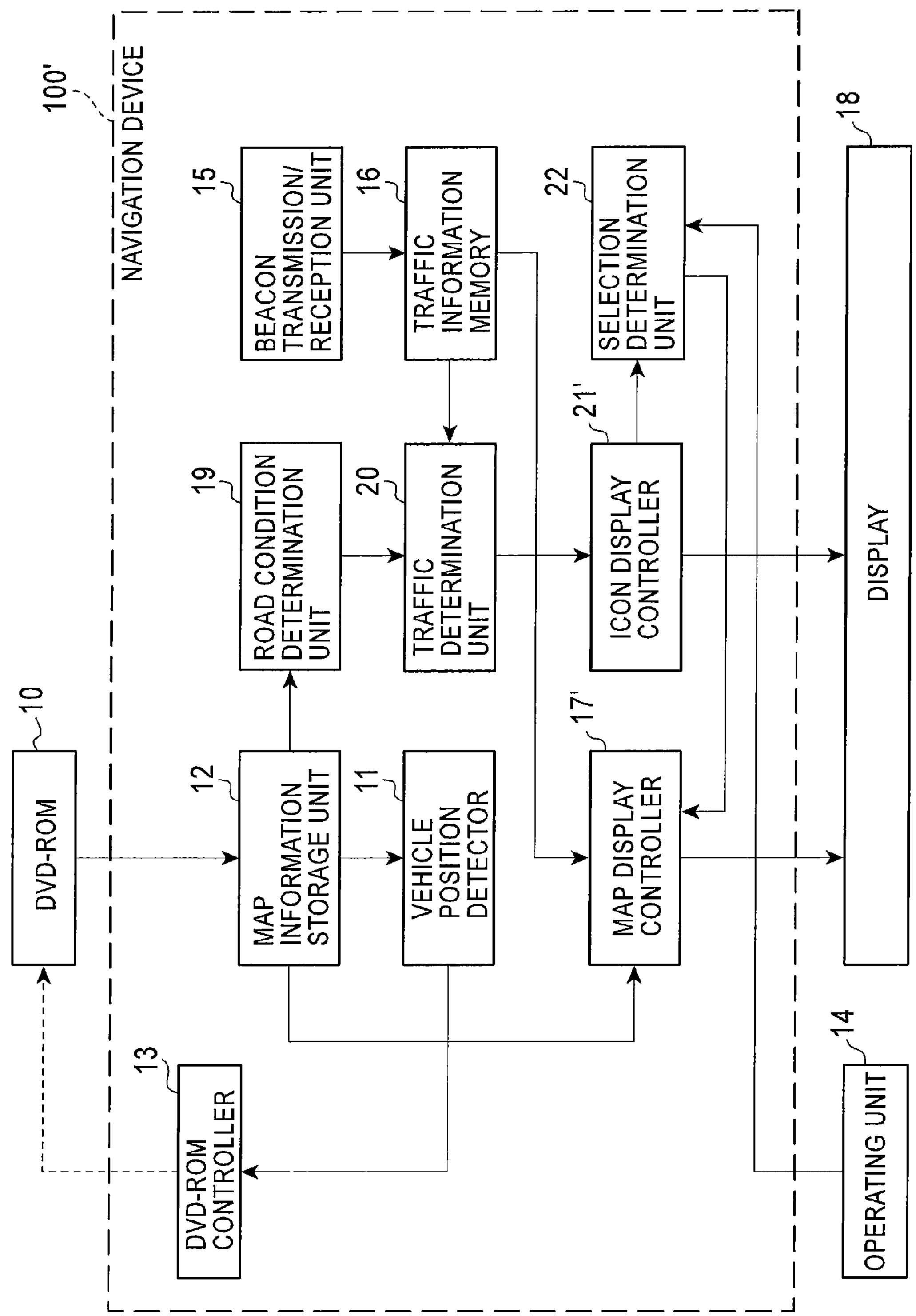
FIG. 4 is a block diagram illustrating another example of a configuration of a navigation device.

FIG. 1 is a block diagram illustrating an example of a configuration of a navigation device 100. In FIG. 1, a recording medium 10 such as a DVD-ROM (Digital Versatile Disc Read Only Memory) stores various map data required for displaying maps. The map data recorded in the recording medium 10 is managed as a layered structure in a unit of so-called "level" by being divided from a high level map (small-scale map) used to view a wide region to a low level map (large-scale map) used to view a local region in detail.

The map data of various levels include road units constituted by data required for performing various processes such as map matching, route searching, and routing assistance. The road units include information on road links representing vectors obtained by finely dividing roads and lanes and information on nodes corresponding to points in opposite ends of the road links (including points in which a plurality of roads intersect with one another such as intersections and branching points). Note that, although the DVD-ROM 10 is used as the recording medium which stores the map data in this implementation, another recording medium such as a CD-ROM (Compact Disc Read Only Memory), a hard disk, or a semiconductor memory may be used.

A vehicle position detector 11 detects a current position of a vehicle in a predetermined cycle, and includes a self-contained navigation sensor, a GPS receiver, and a CPU used to calculate a position. The self-contained navigation sensor includes a vehicle-speed sensor (distance sensor) that outputs a pulse every predetermined traveling distance so as to detect a moving distance of the vehicle, and an angular-speed sensor (relative direction sensor) that detects a rotation angle (traveling direction) of the vehicle. The self-contained navigation sensor detects a relative position and a direction of the vehicle using the vehicle-speed sensor and the angular-speed sensor.

The CPU calculates an absolute vehicle position of itself (estimated vehicle position) and a direction of the vehicle in accordance with the relative position of the vehicle itself and the direction of the vehicle output from the self-contained navigation sensor. Furthermore, the GPS receiver receives electric waves transmitted from a plurality of GPS satellites using a GPS antenna and performs a three-dimensional positioning process or a two-dimensional positioning process so as to calculate the absolute position and the direction of the vehicle (the direction of the vehicle is calculated on the basis of a current position of the vehicle and a position of the vehicle one sampling time $\Delta T$ ago).

A map information storage unit 12 temporarily stores the map data read from the DVD-ROM 10 under control of a DVD-ROM controller 13. The DVD-ROM controller 13 controls the reading of the map data from the recording medium 10. That is, the DVD-ROM controller 13 receives information on a vehicle current position from the vehicle position detector 11 and outputs an instruction for reading data of a map of a predetermined range including the vehicle current position to thereby read the map data required for map display from the DVD-ROM 10 and store the map data in the map information storage unit 12.

An operating unit 14 such as a remote controller includes various operating members (including buttons and a joystick) used to set various information (such as a destination and a location to be passed through of the routing assistance) and to perform various operations (such as an operation of selecting a menu, an icon, and a button, and an operation of manual map scrolling, and an operation of inputting text). Note that, although the remote controller 14 is used in this implementation, a touch panel may be used.

When map scrolling is performed using the operating unit 14, the DVD-ROM controller 13 outputs an instruction for reading data of a map of a predetermined range including a cursor position to the DVD-ROM 10. Then, the DVD-ROM controller 13 reads the map data required for displaying the map of the predetermined range including the cursor position as a center from the DVD-ROM 10 and stores the map data in the map information storage unit 12.

A beacon transmission/reception unit 15 (corresponding to a traffic information obtaining unit according to the present invention) performs bidirectional communication using electric waves with electric wave beacon transmission/reception units mainly installed in the expressways and performs bidirectional communication using light with optical beacon transmission/reception units mainly installed in the general roads to thereby receive VICS information (traffic information) transmitted from the VICS center. The beacon transmission/reception unit 15 successively stores traffic information received from the VICS center in a traffic information memory 16.

The traffic information represents congestion levels in specific portions of VICS links (links which can receive the traffic information) and includes VICS link IDs, congestion lengths, and congestion levels. The VICS link IDs represent link numbers corresponding to individual roads. Each of the congestion lengths represents a distance between a start point (one end of a VICS link) of a traffic congestion to an end point of the traffic congestion. Each of the congestion levels represents one of three states including a "normal" state in which vehicles are normally traveling, a "crowded" state in which speeds of vehicles are equal to or lower than a predetermined speed, and a "congestion" state in which vehicles hardly move.

A map display controller 17 controls display of a map of a region around a vehicle position in a display 18 in accordance with the map data stored in the map information storage unit 12. Here, the map display controller 17 generates map image data in accordance with the map data and further generates traffic line image data representing traffic conditions of roads in accordance with the traffic information stored in the traffic information memory 16. Then, the map display controller 17 displays blinking red traffic lines representing traffic congestion sections and blinking orange traffic lines representing crowded sections along the roads corresponding to the links. Furthermore, the map display controller 17 displays blue traffic lines along roads which do not have heavy traffic.

A road condition determination unit 19 determines whether the roads displayed in the display 18 include a plurality of roads (hereinafter simply referred to as "vicinity/connection roads") which belong to a predetermined road type and which are located within a predetermined distance (for example, tens of meters) of one another or are connected to one another in accordance with the map data stored in the map information storage unit 12. In this implementation, the predetermined road type corresponds to a type of roads of a certain rank or more such as national expressways, urban expressways, or general national roads. Note that a case where a plurality of roads are located within a predetermined distance of one another includes a case where a plurality of roads extend in parallel with a distance equal to or smaller than a predetermined distance therebetween and a case where a plurality of roads have circular arch portions which are considerably curved and the circular arches are located within a predetermined distance of one another. Furthermore, a case where a plurality of roads are connected to one another includes a case where a plurality of national expressways and urban expressways (hereinafter collectively referred to as "expressways") are connected to one another through connection paths such as ramps of the expressways. When determining that the vicinity/connection roads are included, the road condition determination unit 19 transmits information on a result of the determination to a traffic determination unit 20.

When receiving the notification representing that a plurality of vicinity/connection roads are included, the traffic determination unit 20 determines whether at least one of the plurality of roads is in a congestion state (that is, whether a congestion level is the "crowded" level or the "congestion" level) in accordance with the traffic information stored in the traffic information memory 16. When the determination is affirmative, the traffic determination unit 20 transmits information on a result of the determination to an icon display controller 21.

When receiving the information on the result of the determination from the traffic determination unit 20, the icon display controller 21 displays an icon used to instruct display of a simple road graphic screen, which will be described hereinafter, near the vicinity/connection roads. Then, the icon display controller 21 notifies a selection determination unit 22 of information representing that the icon is displayed.

FIG. 2A is a diagram illustrating an example of screen display of the icon of the DVD-ROM 10. Note that a screen shown in FIG. 2A may display an image of a map of a region around the vehicle position in accordance with traveling of the vehicle or may display an image of a map of a region around a position of a cursor displayed by map scrolling. In the example shown in FIG. 2A, a plurality of vicinity/connection roads (ramps) which belong to a predetermined road type (expressways) and which are connected to each other are included in a region 200. In this case, the icon display controller 21 receives a notification representing that at least one of the plurality of vicinity/connection roads is in a congestion state from the traffic determination unit 20, and displays an icon 210 used to instruct display of a simple road graphic screen near the plurality of vicinity/connection roads.

The selection determination unit 22 determines whether the icon displayed by the icon display controller 21 was selected through a user's operation performed using the operating unit 14 within a predetermined period of time after the notification is transmitted from the icon display controller 21. When the determination is affirmative, the selection determination unit 22 transmits information on a result of the determination to a simple-road-graphic-screen display controller 23. When receiving the information representing that the icon is selected within the predetermined period of time from the selection determination unit 22, the simple-road-graphic-screen display controller 23 replaces the map image displayed by the map display controller 17 by a simple road graphic screen to be displayed in the display 18.

FIGS. 2B and 2C are diagrams illustrating examples of display of the simple road graphic screen. When the icon 210 is selected in the screen shown in FIG. 2A, a plurality of vicinity/connection roads included in the region 200 are displayed in a deformed manner as shown in FIG. 2B. In FIG. 2B, a frame mark 220 corresponds to a frame of the region 200. Intersection marks 230*a* to 230*h* represent intersections of the frame mark 220 and images of the plurality of vicinity/connection roads. The user can easily select a desired one of the vicinity/connection roads by selecting one of the intersection marks using the operating unit 14 (by an operation of tilting the joystick, not shown, in this implementation).

FIG. 2B shows a state in which the intersection mark 230*a* is selected by default. The intersection mark 230*a* is displayed so as to be different from the other intersection marks 230*b* to 230*h* which have not been selected. Note that the intersection mark 230*a* which has been selected by default is located on a road in which the vehicle is currently traveling and nearest the vehicle position, for example. Therefore, an operation of selecting an intersection mark on the road where the vehicle is currently traveling and which is highly possible that the user wishes to obtain a traffic condition thereof can be eliminated, which is convenient.

In response to the selection of the intersection mark 230*a*, the simple-road-graphic-screen display controller 23 displays a plurality of vicinity/connection roads 240*a* to 240*c* which extend from the intersection marks 230*a* in an emphasized manner so that the vicinity/connection roads 240*a* to 240*c* have a color that is different from that of other vicinity/connection roads. Furthermore, the simple-road-graphic-screen display controller 23 displays only traffic lines 250*a* to 250*c* corresponding to the vicinity/connection roads 240*a* to 240*c* along the vicinity/connection roads 240*a* to 240*c*. In this state, the user can select one of the other intersection marks instead of the intersection mark 230*a* which is currently selected through an operation using the operating unit 14.

A selection acceptance unit 24 accepts a selection of one of the plurality of vicinity/connection roads (the intersection marks which intersect with the frame mark 220 in FIG. 2B) in the simple road graphic screen displayed by the simple-road-graphic-screen display controller 23, the selection being performed by a user's operation of the operating unit 14. When accepting the selection of one of the plurality of vicinity/connection roads, the selection acceptance unit 24 notifies the simple-road-graphic-screen display controller 23 of the selection. In response to the notification, the simple-road-graphic-screen display controller 23 displays the selected vicinity/connection road, the selection of which has been accepted by the selection acceptance unit 24 so that the selected vicinity/connection road has a color that is different from that of the other vicinity/connection roads. In addition, the simple-road-graphic-screen display controller 23 displays only traffic lines corresponding to the selected vicinity/connection road.

For example, in a state shown in FIG. 2B, if a selection of the intersection mark 230*c* is accepted as the selection of one of the vicinity/connection roads in the simple road graphic screen by the selection acceptance unit 24, the simple-road-graphic-screen display controller 23 emphatically displays a plurality of vicinity/connection roads 270*a* to 270*c* which extend from the selected intersection mark 230*c* so that the vicinity/connection roads 270*a* to 270*c* have a color that is different from that of the other vicinity/connection roads as shown in FIG. 2C. Furthermore, the simple-road-graphic-screen display controller 23 displays only a traffic line 280 corresponding to the vicinity/connection road 270*b* along the vicinity/connection road 270*b*.

In the simple road graphic screen of this implementation, blue traffic lines are not displayed along vicinity/connection roads having congestion levels of "normal". In an example of FIG. 2C, since the vicinity/connection roads 270*a* and 270*c* have congestion levels of "normal", traffic lines are not displayed along the vicinity/connection roads 270*a* and 270*c*. Accordingly, the user can more easily recognize traffic conditions of vicinity/connection roads which have heavy traffic and can more clearly recognize the relationships between the traffic lines and the vicinity/connection roads.

Note that, when the selection acceptance unit 24 accepts another intersection mark in the simple road graphic screen, the simple-road-graphic-screen display controller 23 performs display control the same as that described with reference to FIGS. 2B and 2C.

Next, operation of a navigation device 100 will be described in detail. FIG. 3 is a flowchart illustrating an example of an operation of the navigation device 100. In FIG. 3, a process in step S100 is started when the navigation device 100 is activated, for example.

First, the map display controller 17 generates map image data required for displaying a map in the display 18 in accordance with the map data stored in the map information storage unit 12 (in step S100). The map image data generated by the map display controller 17 represents an image of a map of a region around a vehicle position or an image of a map of a region around a cursor position obtained when manual map scrolling is performed. Next, the beacon transmission/reception unit 15 receives traffic information transmitted from the VICS center (in step S120). Then, the beacon transmission/reception unit 15 stores the received traffic information in the traffic information memory 16.

Subsequently, the map display controller 17 outputs the map image data generated in step S100 to the display 18 so as to display a map image, generates traffic line image data representing traffic conditions of roads in accordance with the traffic information stored in the traffic information memory 16, and outputs the generated traffic line image data to the display 18 so as to display traffic lines along certain roads corresponding to links (in step S140).

The road condition determination unit 19 determines whether a plurality of vicinity/connection roads are included in the roads displayed in the display 18 in accordance with the map data stored in the map information storage unit 12 (in step S160). When the determination is negative in step S160, the process proceeds to step S320.

On the other hand, when the determination is affirmative in step S160, the traffic determination unit 20 determines whether at least one of the plurality of vicinity/connection roads has heavy traffic in accordance with the traffic information stored in the traffic information memory 16 (that is, whether at least one of the plurality of vicinity/connection roads has a congestion level of "crowded" or "congestion") in step S180. When the determination is negative in step S180, the process proceeds to step S320.

On the other hand, when the determination is affirmative in step S180, the icon display controller 21 displays icons used to instruct display of simple road graphic screens near the plurality of vicinity/connection roads in step S200.

The selection determination unit 22 determines whether one of the icons displayed by the icon display controller 21 is selected within a predetermined period of time through a user's operation using the operating unit 14 in step S220. When the determination is negative in step S220, the process proceeds to step S320.

On the other hand, when the determination is affirmative in step S220, the simple-road-graphic-screen display controller 23 displays a simple road graphic screen in the display 18 in step S240 instead of the map image which has been displayed by the map display controller 17. Note that the simple-road-graphic-screen display controller 23 displays a vicinity/connection road which has been selected by default so that the vicinity/connection road has a color different from that of the other vicinity/connection roads and displays only a traffic line corresponding to the selected vicinity/connection road.

Then, the selection acceptance unit 24 determines whether a selection of one of the plurality of vicinity/connection roads in the simple road graphic screen displayed by the simple-road-graphic-screen display controller 23 in accordance with the user's operation using the operating unit 14 is accepted in step S260. When the determination is negative in step S260, the process proceeds to step S300.

On the other hand, when the determination is affirmative in step S260, the simple-road-graphic-screen display controller 23 displays the selected vicinity/connection road which has been accepted by the selection acceptance unit 24 so that the selected vicinity/connection road has a color different from that of the other vicinity/connection roads, and in addition, displays only a traffic line corresponding to the selected vicinity/connection road which has been accepted in step S280. Subsequently, the navigation device 100 determines whether a predetermined period of time has been elapsed with reference to a timer, not shown, in step S300.

When the determination is negative in step S300, the process returns to step S260. On the other hand, when the determination is affirmative in step S300, the navigation device 100 determines whether a main power is turned off in step S320.

When the determination is negative in step S320, the process returns to step S100. On the other hand, when the determination is affirmative in step S320, the navigation device 100 terminates the process of FIG. 3.

As described above in detail, in implementations described above, the selected vicinity/connection road and the other vicinity/connection roads are displayed so that the selected vicinity/connection road has a color different from that of the vicinity/connection roads, and in addition, only the traffic line corresponding to the selected vicinity/connection road is displayed. Accordingly, in implementations described above, the user recognizes the relative positions of the plurality of vicinity/connection roads in the simple road graphic screen, distinguishes the selected vicinity/connection road from the other vicinity/connection roads by the display color, and visibly distinguishes the traffic lines corresponding to the vicinity/connection roads from one another by displaying or not displaying the traffic lines. Therefore, the user can reliably recognize the relationship between the displayed traffic lines and the corresponding vicinity/connection roads selected from among the plurality of vicinity/connection roads which extend in a concentrated manner.

Furthermore, in implementations described above, it is determined whether the plurality of vicinity/connection roads are included in the roads which belong to the predetermined road type (roads of a predetermined rank or more). By this, the number of icons which may be unnecessarily displayed and which correspond to a plurality of vicinity/connection roads shown in various portions of the map image is reduced. Accordingly, an easy-to-read map for the user can be obtained.

Note that, although a case where the selected vicinity/connection road and the other vicinity/connection roads are displayed so as to be distinguished from each other by color and only the traffic line corresponding to the selected vicinity/connection road is displayed is described as an example of emphasizing display of a group of the selected vicinity/connection road and the corresponding traffic line relative to other groups of the vicinity/connection roads and the traffic lines in implementations described above, the present invention is not limited to this. For example, the simple-road-graphic-screen display controller 23 may display only the group of the selected vicinity/connection road and the corresponding traffic line. In this case, the user can more reliably recognize the relationship between the selected vicinity/connection road and the traffic line. Note that, although the relative positions of the plurality of vicinity/connection roads are not recognized in the simple road graphic screen, the relative positions can be roughly recognized by the map image displayed before the simple road graphic screen is displayed.

Furthermore, the simple-road-graphic-screen display controller 23 may display the selected vicinity/connection road and the corresponding traffic line so that they have widths larger than those of the other vicinity/connection roads and traffic lines corresponding to the other vicinity/connection roads. Moreover, the simple-road-graphic-screen display controller 23 may highlight the group of the selected vicinity/connection road and the corresponding traffic line for display.

Furthermore, although a case where the simple road graphic screen is displayed when the icon used to instruct display of the simple road graphic screen is selected is described as an example in implementations described above, the present invention is not limited to this. For example, the simple road graphic screen may be simply displayed when the roads displayed in the screen include a plurality of vicinity/connection roads which belong to a predetermined road type and at least one of the plurality of vicinity/connection roads has heavy traffic. Note that the case where the simple road graphic screen is displayed in response to a selection of an icon performed in accordance with a user's operation using the operating unit 14 is more preferable since an undesired simple road graphic screen is prevented from being unnecessarily displayed.

Furthermore, although a case where a desired vicinity/connection road is selected by selecting one of the plurality of intersection marks by a tilting operation of the joystick is described as an example in implementations described above, the present invention is not limited to this. For example, a desired vicinity/connection road may be selected by touching one of the plurality of intersection marks in the simple road graphic screen. Furthermore, a desired vicinity/connection road may be selected by directly touching one of the vicinity/connection roads without displaying the intersection marks in the simple road graphic screen. Note that, since the plurality of vicinity/connection roads are displayed such that they are located near one another or intersect with one another even in the simple road graphic screen, it is difficult to accurately touch a desired vicinity/connection road. Therefore, it is preferable that a desired vicinity/connection road is selected by displaying intersection marks and touching one of the intersection marks.

FIG. 4 is a block diagram illustrating another example of a configuration of a navigation device 100'. Note that, in FIG. 4, components denoted by reference numerals the same as those of FIG. 1 have functions the same as those described above, and therefore, descriptions thereof are omitted. In some implementations, the navigation device 100' includes a map display controller 17' and an icon display controller 21' instead of the map display controller 17 and the icon display controller 21 shown in FIG. 1, respectively. Furthermore, the navigation device 100' does not include the simple-road-graphic-screen display controller 23 and the selection acceptance unit 24 shown in FIG. 1.

The icon display controller 21' determines whether a display scale of a map image which has been displayed is larger than an enlargement-display scale (1 mile scale in this implementation) which is a display scale set in advance for displaying the map image in an enlargement manner. When the determination is affirmative, the icon display controller 21' displays icons used to instruct display of simple road graphic screens near a plurality of vicinity/connection roads.

When a selection determination unit 22 determines that one of the icons displayed in the map image is selected, the map display controller 17' (corresponding to a separation display controller in the present invention) generates map image data used to display the map image which has been displayed in the enlargement manner in the enlargement-display scale, and further generates traffic line image data representing traffic conditions of roads in accordance with traffic information stored in a traffic information memory 16. Then, the map display controller 17' outputs the map image data and the traffic line image data to a display 18 so as to display a map image in an enlargement manner and display blinking red traffic lines representing traffic congestion sections and blinking orange traffic lines representing crowded sections along the roads corresponding to links included in the map image which is displayed in the enlargement manner. In addition, the map display controller 17' displays blue traffic lines along roads which do not have heavy traffic.

Figure 5A:
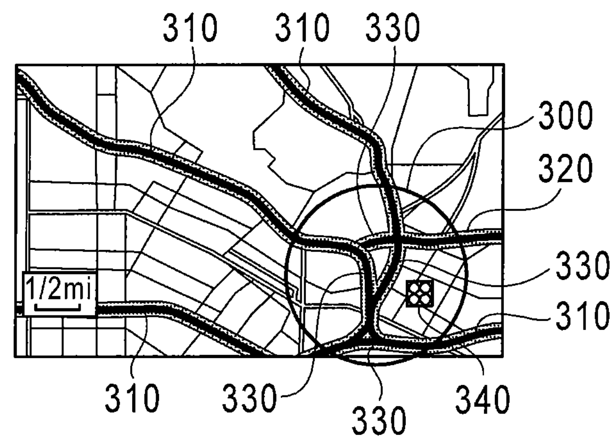
FIGS. 5A and 5B are diagrams illustrating additional examples of screen displays of a navigation device.
Figure 5B:
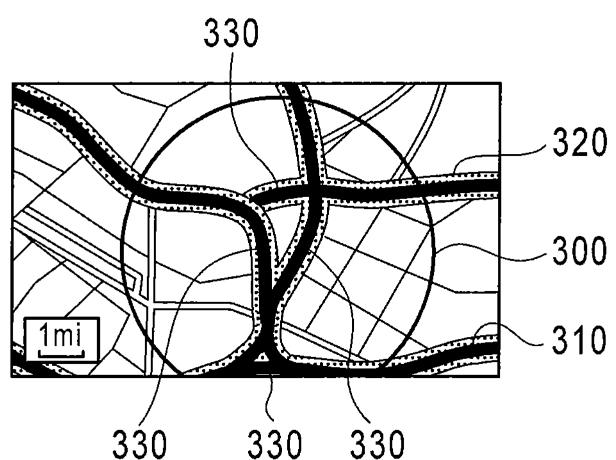

FIGS. 5A and 5B are diagrams illustrating additional examples of screen display of the navigation device 100'. A display screen shown in FIG. 5A shows an image of a map of a region around a vehicle position displayed in accordance with traveling of the vehicle or an image of a map of a region around a cursor position displayed by scrolling the map. Note that a display scale of the map image shown in FIG. 5A is a ½ mile scale which is a display scale selected by a user in advance (a display scale which has been set in a user memory, not shown).

As shown in FIG. 5A, in the map image displayed in the display 18, roads 310 of a predetermined road type (expressways) and traffic lines 320 displayed along the expressways 310 are shown. In a region 300 included in the map image, the plurality of expressways 310 are connected to one another. That is, the plurality of expressways 310 serve as a plurality of vicinity/connection roads 330.

In this case, when receiving a notification representing that at least one of the plurality of vicinity/connection roads 330 has heavy traffic from a traffic determination unit 20, the icon display controller 21' determines whether the display scale (½ mile scale) in the map image which has been displayed is larger than the enlargement-display scale (1 mile scale). In this implementation, since the display scale of the map image which has been displayed is larger than the enlargement-display scale, an icon 340 used to instruct display of a simple road graphic screen is displayed near the plurality of vicinity/connection roads 330.

When the icon 340 is selected using an operating unit 14, the map display controller 17' generates map image data used to display a map including the region 300 and a region around the region 300 in an enlargement manner in the enlargement-display scale and generates traffic line image data representing traffic conditions of the roads in accordance with the traffic information stored in the traffic information memory 16. Then, the map display controller 17' outputs the map image data and the traffic line image data to the display 18. In this way, the map image is displayed in an enlargement manner, and blinking red traffic lines representing congestion sections and blinking orange traffic lines representing crowded sections are displayed along the roads corresponding to the links included in the map image which has been displayed in the enlarged manner, and blue traffic lines are displayed along roads which do not have heavy traffic.

FIG. 5B shows an example of screen display in a case where the map including the region 300 and the region around the region 300 is displayed in the enlargement manner in the enlargement-display scale under control of the map display controller 17'. As shown in FIG. 5B, display positions of the plurality of vicinity/connection roads 330 included in the region 300 are separate from one another and display positions of the traffic lines 320 corresponding to the vicinity/connection roads 330 are separate from one another. Therefore, a user who sees the screen display of the display 18 can clearly distinguish pairs of vicinity/connection road 330 and traffic lines 320 from one another.

Note that the display scale of the map image shown in FIG. 5A is the ½ mile scale which is a comparatively small scale. However, in a case where the map image is displayed in a larger display scale, the vicinity/connection roads 330 and the traffic lines 320 are displayed in a concentrated manner. Accordingly, it is difficult to distinguish the vicinity/connection roads 330 from one another and distinguish the traffic lines 320 from one another. In this case, by displaying the map image in an enlargement manner as shown in FIG. 5B, the vicinity/connection roads 330 are clearly distinguished from one another and the traffic lines 320 are clearly distinguished from one another.

FIG. 6 is a flowchart illustrating an example of an operation of the navigation device 100'. A process in step S400 of FIG. 6 is started when the navigation device 100' is activated, for example. Note that processes in step S400 to step S480 and step S660 in FIG. 6 are the same as those in step S100 to step S180 and step S320 in FIG. 3, respectively, and therefore redundant descriptions thereof are omitted.

When the traffic determination unit 20 determines that at least one of the vicinity/connection roads included in the map image which has been displayed has heavy traffic (when a determination is affirmative in step S480), the icon display controller 21' determines whether the display scale of the map image which has been displayed is larger than the enlargement-display scale (in step S500). When the determination is negative in step S500, the process proceeds to step S660.

On the other hand, when the determination is affirmative in step S500, the icon display controller 21' displays an icon used to instruct display of a simple road graphic screen near the plurality of vicinity/connection roads in step S520. Then, the selection determination unit 22 determines whether the icon displayed by the icon display controller 21' is selected through a user's operation using the operating unit 14 within a predetermined period of time in step S540. When the determination is negative in step S540, the process proceeds to step S660.

On the other hand, when the determination is affirmative in step S540, the map display controller 17' change a setting of the display scale of the map image which has been displayed to the enlargement-display scale in step S560. The map display controller 17' generates map image data used to display a map including a vehicle position and a region around the vehicle position in the enlargement-display scale, and further generates traffic line image data representing traffic conditions of the roads in accordance with the traffic information stored in the traffic information memory 16 in step S580.

Then, the map display controller 17' outputs the generated map image data to the display 18 so as to display a map image, and outputs the generated traffic line image data to the display 18 so as to display traffic lines along the roads corresponding to links in step S600.

Next, the navigation device 100' determines whether a predetermined period of time has been elapsed with reference to a timer, not shown, in step S620. When the determination is negative in step S620, the process in step S620 is performed again. On the other hand, when the determination is affirmative in step S620, the map display controller 17' changes, in step S640, the display scale of the map image which has been displayed back to the display scale which had been set before the display scale is changed in step S560. Thereafter, the process proceeds to step S660.

As described above in detail, in implementations described above, the icon is displayed when roads which have been displayed in the screen include a plurality of vicinity/connection roads, and the display scale is changed to the enlargement-display scale when the icon is selected so that the map image is displayed in the enlargement manner. According to implementations described above, the user can visibly distinguish the vicinity/connection roads and the traffic lines corresponding to the vicinity/connection roads which are located near one another within a predetermined distance or which are connected to one another in a state in which display positions thereof in the map image are separate from one another. Therefore, the user can reliably recognize the relationships between the plurality of vicinity/connection roads arranged in a concentration manner and the traffic lines displayed so as to correspond to the vicinity/connection roads.

Note that, although a case where the display scale is changed to the fixed enlargement-display scale when the icon 340 is selected so that the map image is displayed in the enlargement manner is described as an example in implementations described above, the present invention is not limited to this. For example, a display scale setting unit which sets a display scale in accordance with the number of vicinity/connection roads which are determined, by the road condition determination unit 19, to be located near one another or connected to one another may be additionally included, and the map display controller 17' may change the display scale of the map image to a display scale set by the display scale setting unit so that an enlarged map image is displayed. For example, as the number of vicinity/connection roads is large, the map image is displayed in an enlargement manner in a smaller display scale. By this, the map can be displayed in an appropriate scale in accordance with the number of vicinity/connection roads. Accordingly, visibility when the user sees the screen display can be improved.

Furthermore, in implementations described above, a road determination unit which determines whether at least one of the vicinity/connection roads is connected to a road in which the vehicle is currently traveling at a portion located on a front side of the vehicle in a traveling direction may be additionally provided. Then, only when the determination is affirmative, the simple road graphic screen may be displayed or the icon used to instruct display of the map image in the enlargement manner may be displayed. By this, unnecessary display of icons for vicinity/connection roads which are less possible to be passed by the user can be prevented, and display of a considerably large number of icons which can be seen when the screen display is viewed can be prevented.

Furthermore, only when at least one of the vicinity/connection roads is connected to a portion of a road in which the vehicle is currently traveling, the portion being located on a front side of the vehicle in a traveling direction, and the road has heavy traffic, the simple road graphic screen or the icon used to instruct display of the map image in an enlargement manner may be displayed. By this, even when vicinity/connection roads in which it is unlikely that the user passes have heavy traffic, display of unnecessary icons can be prevented and display of a considerably large number of icons which can be seen when the screen display is viewed can be further prevented.

Moreover, in implementations described above, although a case where the predetermined road type includes the national expressways, the urban expressways, and the general national roads which correspond to a certain rank or more is described, the present invention is not limited to this. For example, the predetermined road type may include main local roads and general prefectural roads in addition to the national expressways, the urban expressways, and the general national roads. Note that when the predetermined road type only includes road types of the certain rank or more, unnecessary icons to be displayed are reduced and excellent visibility of the map display for the user is attained.

In addition, in implementations described above, merely examples of realization of the present invention are illustrated, and a technical scope of the present invention should not be interpreted in a limited way. That is, the present invention may be implemented in various configurations without departing from spirits and main characteristics. It is therefore intended that the foregoing detailed description be regarded as illustrative rather than limiting, and that it be understood that it is the following claims, including all equivalents, that are intended to define the spirit and scope of this invention.

What is claimed is:

1. A navigation device which displays traffic lines representing traffic congestion levels along roads in a map image, the navigation device comprising:

a traffic information obtaining unit configured to obtain traffic information regarding roads;

a road condition determination unit configured to determine whether the roads which have been displayed in a screen include a plurality of roads which belong to a predetermined road type and which are positioned within a predetermined distance of one another or are connected to one another;

a traffic congestion determination unit configured to determine, when the road condition determination unit determines that the plurality of roads which are positioned within a predetermined distance of one another or which are connected to one another are included in the roads which have been displayed in the screen, whether at least one road of the plurality of roads has heavy traffic in accordance with the traffic information obtained by the traffic information obtaining unit; and a simple-road-graphic-screen display controller configured to perform control for displaying a simple road graphic screen when the traffic congestion determination unit determines that at least one road of the plurality of roads has heavy traffic, the simple road graphic screen being a graphic screen comprising one window that is configured to display, as simple road graphics, the plurality of roads that the road condition determination unit determines to be positioned within a predetermined distance from one another or connected to one another;

wherein the simple-road-graphic-screen display controller is configured to perform control such that a group of a selected road of the plurality of roads and a traffic line corresponding to the selected road are displayed in an emphasized manner in the window of simple road graphic screen relative to other groups of road and their corresponding traffic lines.

2. The navigation device according to claim 1, further comprising:

a road determination unit configured to determine whether at least one road of the plurality of roads is connected to a road in a direction of et travel in which a vehicle is currently traveling, wherein the display controller performs control such that the roads of the plurality of roads are displayed so as to visually separate the roads of the plurality of roads from one another and the traffic lines corresponding to the plurality of roads are displayed so as to visually separate the traffic lines corresponding to the plurality of roads from one another only when the road determination unit determines that at least one road of the plurality of roads is connected to a road in a direction of travel in which a vehicle is currently traveling.

3. The navigation device according to claim 1, wherein the simple-road-graphic-screen display controller is configured to perform control such that the selected road and the other roads are displayed so as to be different from each other by different colors, and only the traffic line, among the traffic lines, corresponding to the selected road is displayed.

4. The navigation device according to claim 1, wherein the simple-road-graphic-screen display controller performs control such that a width of the selected road is displayed so as to be larger than those of the other roads and a width of the traffic line corresponding to the selected road is displayed so as to be larger than those of the other traffic lines.

5. The navigation device according to claim 1, wherein the simple-road-graphic-screen display controller performs control such that the group of the selected road and the corresponding traffic line is displayed in a highlighted manner.

6. The navigation device according to claim 1, wherein the simple-road-graphic-screen display controller performs control such that only the group of the selected road and the corresponding traffic line is displayed.

7. The navigation device according to claim 1, further comprising:

an icon display controller configured to perform control such that an icon used to instruct display of the simple road graphic screen is displayed near the plurality of roads that the road condition determination unit determines to be positioned within a predetermined distance of one another or connected to one another; and a selection determination unit configured to determine whether the icon which is controlled to be displayed by the icon display controller was selected, wherein the simple-road-graphic-screen display controller performs control such that the simple road graphic screen is displayed when the selection determination unit determined that the icon is selected.

8. The navigation device according to claim 1, further comprising:

an icon display controller configured to perform control such that an icon used to instruct enlargement of a display scale of the map image is displayed near the plurality of roads which are determined, by the road condition determination unit, to be positioned near to one another or connected to one another; and a selection determination unit configured to determine whether the icon which is controlled to be displayed by the icon display controller was selected, wherein the separate display controller performs, when the selection determination unit determined that the icon was selected, control such that the map image is displayed in an enlargement manner by changing the display scale of the map image which is being displayed to be smaller.

9. The navigation device according to claim 8, wherein the display controller performs control such that the map image is displayed in an enlargement manner by changing the display scale to a predetermined display scale.

10. The navigation device according to claim 8, further comprising:

a display scale setting unit configured to set a display scale in accordance with the number of roads of the plurality of roads that the road condition determination unit determines to be positioned within a predetermined distance of one another or connected to one another, wherein the display controller performs control such that the map image is displayed in an enlargement manner by changing the display scale to a display scale set by the display scale setting unit.

11. A traffic line display method of a navigation device which displays traffic lines representing traffic congestion levels along roads in a map image, the traffic line display method comprising:

obtaining traffic information associated with roads in a map image;

determining whether the roads which have been displayed in a screen include a plurality of roads which belong to a predetermined road type and which are positioned within a predetermined distance of one another or are connected to one another;

determining, when it is determined that the plurality of roads which are positioned within a predetermined distance of one another or which are connected to one another are included in the roads which have been displayed in the screen module, whether at least one of the plurality of roads has heavy traffic in accordance with the obtained traffic information; and performing control for displaying a simple road graphic screen when it is determined that at least one of the plurality of roads has heavy traffic, the simple road graphic screen being a graphic screen comprising one window that displays, as simple road graphics, the plurality of road that are determined to be positioned within a predetermined distance from one another or connected to one another, and performing control such that a group of a selected road of the plurality of roads and a traffic line corresponding to the selected road are displayed in an emphasized manner in the window of the simple road graphic screen relative to other groups of roads and their corresponding traffic lines.

12. The traffic line display method according to claim 11, further comprising:

when it is determined that the plurality of roads which are positioned near one another or which are connected to one another are included in the roads which have been displayed in the screen, determining whether at least one of the plurality of roads is connected to a road in which a vehicle is currently traveling in a direction of travel; and wherein controlling display of the screen is performed such that the plurality of roads are displayed so as to be visually separate from one another and the traffic lines corresponding to the plurality of roads are displayed so as to be visually separate from one another only when it is determined that at least one road of the plurality of roads is connected to a road on which a vehicle is currently traveling in a direction of travel.

13. The traffic line display method according to claim 11, wherein controlling display of the screen is performed such that the selected road and the other roads are displayed so as to be different from each other by different colors, and only the traffic line, among the traffic lines, corresponding to the selected road is displayed.

14. The traffic line display method according to claim 11, wherein controlling display of the screen is performed such that a width of the selected road is displayed so as to be larger than those of the other roads and a width of the traffic line corresponding to the selected road is displayed so as to be larger than those of the other traffic lines.

15. The traffic line display method according to claim 11, wherein controlling display of the screen is performed such that the group of the selected road and the corresponding traffic line is displayed in a highlighted manner.

16. The traffic line display method according to claim 11, wherein controlling display of the screen is performed such that only the group of the selected road and the corresponding traffic line is displayed.

17. The traffic line display method according to claim 11, further comprising:

performing control such that an icon used to instruct display of the simple road graphic screen is displayed near the plurality of roads which are determined to be positioned within a predetermined distance of one another or connected to one another; and determining whether the icon is selected, wherein controlling display of the screen is performed such that the simple road graphic screen is displayed when it is determined that the icon is selected.

* * * * *

UNITED STATES PATENT AND TRADEMARK OFFICE

CERTIFICATE OF CORRECTION

PATENT NO. : 8,645,065 B2
APPLICATION NO. : 12/703379
DATED : February 4, 2014
INVENTOR(S) : Shinobu Doi It is certified that error appears in the above-identified patent and that said Letters Patent is hereby corrected as shown below:

In the Claims

In column 13, claim 2, line 66, after "road in a direction of" delete "~~of~~".

Signed and Sealed this
Twenty-seventh Day of May, 2014

Michelle K. Lee
*Deputy Director of the United States Patent and Trademark Office*